(12) United States Patent
S (10) Patent No.: US 12,499,113 B2
(45) Date of Patent: Dec. 16, 2025

(54) EFFICIENT DATABASE STRUCTURED QUERY LANGUAGE EXECUTION FROM APPLICATION LAYER

(71) Applicant: SAP SE, Walldorf (DE)

(72) Inventor: Anbusivam S, Bangalore (IN)

(73) Assignee: SAP SE, Walldorf (DE)

( * ) Notice: Subject to any disclaimer, the term of this patent is extended or adjusted under 35 U.S.C. 154(b) by 194 days.

(21) Appl. No.: 17/578,092

(22) Filed: Jan. 18, 2022

(65) Prior Publication Data

US 2023/0229660 A1 Jul. 20, 2023

(51) Int. Cl.
*G06F 16/2453* (2019.01)
*G06F 16/22* (2019.01)
*G06F 16/242* (2019.01)

(52) U.S. Cl.
CPC .... *G06F 16/24549* (2019.01); *G06F 16/2255* (2019.01); *G06F 16/2448* (2019.01); *G06F 16/24542* (2019.01)

(58) Field of Classification Search
CPC ........... G06F 16/24549; G06F 16/2255; G06F 16/2448; G06F 16/24542
See application file for complete search history.

(56) References Cited

U.S. PATENT DOCUMENTS

| | | | | |
|---|---|---|---|---|
| 7,444,410 | B1* | 10/2008 | Hichwa | G06F 16/951 709/219 |
| 10,157,419 | B1* | 12/2018 | Xu | G06Q 40/06 |
| 11,308,106 | B1* | 4/2022 | Muralimanohar | G06F 16/27 |
| 2001/0051956 | A1* | 12/2001 | Bird | G06F 16/24524 707/999.005 |
| 2003/0191868 | A1* | 10/2003 | Espino | H04L 9/40 719/328 |
| 2005/0097090 | A1* | 5/2005 | Bird | G06F 21/6209 |
| 2005/0149537 | A1* | 7/2005 | Balin | G06F 16/214 |
| 2006/0112123 | A1* | 5/2006 | Clark | G06F 40/18 |
| 2006/0116975 | A1* | 6/2006 | Gould | G06F 16/48 |
| 2006/0136493 | A1* | 6/2006 | Muralidharan | G06F 21/6227 |
| 2006/0184887 | A1* | 8/2006 | Popp | G06F 16/972 707/E17.117 |
| 2012/0154389 | A1* | 6/2012 | Bohan | G06F 9/5072 345/419 |

(Continued)

*Primary Examiner* — Vaishali Shah
(74) *Attorney, Agent, or Firm* — SCHWEGMAN LUNDBERG & WOESSNER, P.A.

(57) ABSTRACT

In an example embodiment, rather than passing SQL statements directly from an application runtime to a relational database, the SQL statements are first passed to a wrapper functionality. The wrapper functionality takes the uncompelled SQL statements and arguments that need to be passed for the SQL statement as input parameters, executes the statement, and returns the results. This is accomplished by generating a hash identification out of the string SQL statement. The wrapper functionality then looks for a hash identification of an input SQL statement. If it exists, then a corresponding object in the database can be retrieved and executed. If the hash identification is not found, a database object is created that performs the same functionality as the SQL statement. At this time, the SQL statement is also precompiled, and an execution plan created either by the wrapper functionality or the relational database, or both).

20 Claims, 7 Drawing Sheets

(56) References Cited

U.S. PATENT DOCUMENTS

| | | | |
|---|---|---|---|
| 2013/0231043 A1* | 9/2013 | Tawfiq Moshtaha | H04W 4/90 455/3.01 |
| 2013/0318191 A1* | 11/2013 | Yin | H04L 67/5682 709/213 |
| 2017/0039046 A1* | 2/2017 | Henke | G06Q 10/0631 |
| 2018/0046675 A1* | 2/2018 | Zhou | G06F 16/24549 |
| 2018/0129688 A1* | 5/2018 | Colrain | G06F 16/217 |
| 2018/0276256 A1* | 9/2018 | Sarkar | G06F 18/2321 |
| 2019/0332698 A1* | 10/2019 | Cho | G06F 16/2393 |
| 2020/0097587 A1* | 3/2020 | Klein | G06F 16/21 |
| 2020/0192887 A1* | 6/2020 | Peng | G06F 16/252 |
| 2020/0293533 A1* | 9/2020 | Chen | G06F 16/24542 |
| 2021/0073184 A1* | 3/2021 | Almaraz | G06F 16/113 |
| 2021/0081382 A1* | 3/2021 | Colrain | G06F 16/217 |
| 2022/0300513 A1* | 9/2022 | Gruszecki | G06F 16/24545 |

\* cited by examiner

EFFICIENT DATABASE STRUCTURED QUERY LANGUAGE EXECUTION FROM APPLICATION LAYER

BACKGROUND

A runtime is the supporting code, tools, or components that implement a programming language's execution. An application runtime a runtime used to execute a particular application. An example of an application runtime is a Java virtual machine, although generally the application runtime can be written in any computer language and may be configured to execute any type of application.

BRIEF DESCRIPTION OF DRAWINGS

The present disclosure is illustrated by way of example and not limitation in the figures of the accompanying drawings, in which like references indicate similar elements.

DETAILED DESCRIPTION

The description that follows discusses illustrative systems, methods, techniques, instruction sequences, and computing machine program products. In the following description, for purposes of explanation, numerous specific details are set forth in order to provide an understanding of various example embodiments of the present subject matter. It will be evident, however, to those skilled in the art, that various example embodiments of the present subject matter may be practiced without these specific details.

Often an application runtime will need to connect with a database to read information from or write information to storage. One common database type used for this purpose is a relational database. A relational database is a collection of data items with predefined relationships between them, organized as a set of tables with columns and rows. Relational databases are accessed via structured query language (SQL) queries. For example, if there is an employee table, this table may contain columns such as name, age, sex, occupation, department, etc. This is structured information stored in the database. To access this information, a SQL query such as 'select name, age, sex from employee_table" is executed. Similarly, the application runtime can insert data into the database, such as by using the statement "insert into employee_table (Phillip, 44, male, engineer, mechanical)." Other types of SQL statements include "update" and "delete."

One example of a relational database is an in-memory database management system, such as HANA® from SAP SE of Walldorf, Germany. An in-memory database (also known as an in-memory database management system) is a type of database management system that primarily relies on main memory for computer data storage. It is contrasted with database management systems that employ a disk storage mechanism. In-memory databases are traditionally faster than disk storage databases because disk access is slower than memory access.

The SQL statements are passed to the database from the application layer, and the database then compiles them and prepares an execution plan. The execution plan indicates how internally the database needs to act in order to execute the SQL statement, such as what tables need to be accessed, what type of index to use, etc. This is a time-consuming process, however, which can cause delays at runtime when users are trying to get to or provide information to the database. One way to solve this issue is to precompile SQL statements as database modules. Such precompiled modules are called "views," "stored procedures", etc., and an execution plan is kept prepared by the database for these precompiled database objects. It creates a heavy burden on application runtime developers, who need to anticipate as much as possible the SQL statements that are going to be run so that they can be precompiled. Additionally, since these views objects need to be created at the database level, it can be challenging for application runtime developers to write code at that level as they may not be familiar with it.

Another possibility is the use of libraries. These libraries may include functions that can create a connection to the database and execute the SQL statements, leaving room for parameters to be filled in at runtime. The first time it is executed it will need to be compiled, but subsequent times that SQL statements are executed, they will have already been partially or completely compiled, reducing delay. This solution, however, requires that, in order to get the benefits of the pseudo-precompiling, the same connection will need to be used for subsequent executions of the query. If a different connection is utilized, then the subsequent executions will themselves also need to be compiled at runtime, causing the delays. This is because the compiled statement needs to be kept alive in a cache that is associated with a connection. Thus, this solution does not work well in a cloud environment. In a cloud environment, the application runtime serves multiple users and multiple customers simultaneously, and each user or customer gets their own connection between the application runtime and the database. This is for various technical reasons, including security and reliability. Additionally, cloud environments generally require that the connection be immediately terminated once the query has been fulfilled, in order to ensure that they don't get overloaded with open connections, which then of course further limits the ability to keep the compiled statement alive.

In an example embodiment, rather than passing SQL statements directly from an application runtime to a relational database, the SQL statements are first passed to a wrapper functionality. Wrapper functionality involves a data structure or software that contains, or "wraps around," other data or software, so that the contained elements can exist in the newer system. The wrapper functionality takes the uncompiled SQL statements and arguments that need to be passed for the SQL statement as input parameters, executes the statement, and returns the results. This is accomplished by generating a hash identification out of the string SQL statement. A lookup table stores mappings between hash identification and database object names, database object types, and database object creation timestamps. This allows an object name to be read using the hash identification. The object type may then be used to execute the object based on its type. The timestamps are then used to identify how old the object is so that it can be either regenerated if it is too old or deleted if very old. Regeneration helps in accommodating the latest changes; and cleanup helps in halting accumulation of obsolete objects.

The lookup table may then be used to check for the existence of a hash identification of an input SQL statement. If it exists, then the details of the object are read from the lookup table, and the corresponding object is executed based on its object type. If the hash identification does not exist in the lookup table, a database object is created that performs the same functionality as the SQL statement and the details of the object are stored in the lookup table, prior to it being executed. At this time, the SQL statement is also precompiled and an execution plan created either by the wrapper functionality or the relational database, or both). The compiled SQL statement is then stored in the object (along with, optionally, the execution plan).

Using this method, the connection between the application runtime and the relational database can be closed, but the next time the SQL statement is executed the lookup table may be used to retrieve the object name and type, which then can be used to execute the object stored in the relational database, without a need for it to be recompiled or for an execution plan to be created again. i This allows the solution to operate in a cloud environment, where connections need to be closed after the SQL statement is executed.

Figure 1:
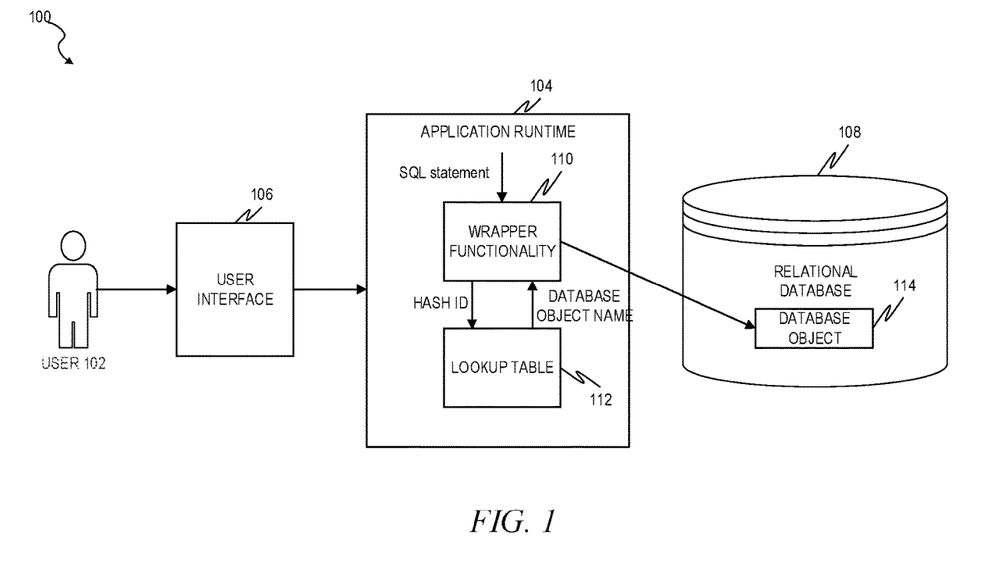
FIG. 1 is a block diagram illustrating a system for executing a SQL statement, in accordance with an example embodiment.

FIG. 1 is a block diagram illustrating a system 100 for executing a SQL statement, in accordance with an example embodiment. A user 102 may interact with an application runtime 104 via a user interface 106. As part of the interaction, the application runtime 104 may need to access a relational database 108 to perform an SQL statement. Rather than send this statement directly to the database, it is instead passed to a wrapper functionality 110. The wrapper functionality 110 performs a hash function on the SQL statement to generate a hash identification corresponding uniquely to the SQL statement. A hash function is a function that converts data of an arbitrary size to a fixed sized unique value. A hash function is deterministic, meaning that for a given input value it always generates the same hash identification. It should be noted that the presence of user 102 is optional. The triggers can come from other sources, such as computing events, or any other component that needs an SQL statement execution.

The wrapper functionality 110 then looks up the hash identification in a lookup table 112. The lookup table may maintain mappings between hash identifications and object names (and optionally other object details, such as object type and timestamp). The object names are names of objects already stored in the relational database 108 that perform SQL statement functionality. If the hash identification is not found in the lookup table, then the wrapper functionality 110 creates a database object 114 in the relational database 108. The database object 114 is created such that when it is executed it performs the functionality of the SQL statement. This creation process includes precompiling the SQL statement and storing the compiled SQL statement in the database object 114, as well as creating an execution plan for the compiled SQL statement.

Whether by virtue of having been newly created, or by virtue of its name being found in the lookup table in a mapping corresponding to the hash identification during a subsequent execution of the SQL statement, the database object 114 may then be executed to run the SQL statement. This may include executing the SQL statement differently depending upon the object type of the database object 114. Additionally, in certain instances an object that already exists may be regenerated or deleted if it exceeds one or more preset temporal thresholds (e.g., objects older than 4 months need to be regenerated, objects older than 1 year need to be deleted). The wrapper functionality 110 may be part of a library that exists on the application runtime 104.

Figure 2:
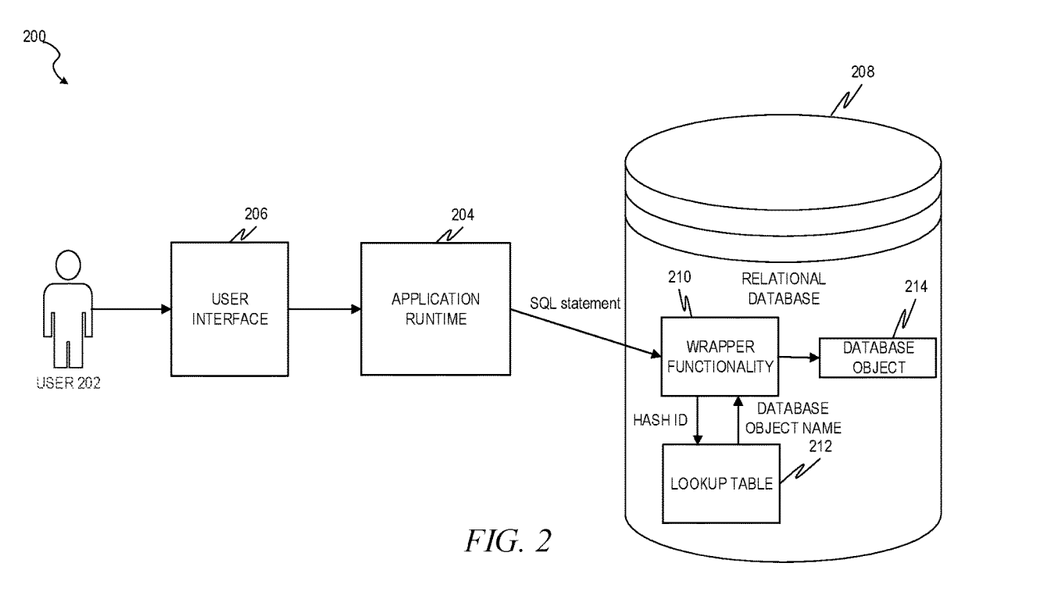
FIG. 2 is a block diagram illustrating a system for executing a SQL statement, in accordance with another example embodiment.

FIG. 2 is a block diagram illustrating a system 200 for executing a SQL statement, in accordance with another example embodiment. This embodiment is similar to that of FIG. 1, except the wrapper functionality 210 is implemented in the relational database 208, such as a stored procedure/function in the database layer.

A user 202 may interact with an application runtime 204 via a user interface 206. As part of the interaction, the application runtime 204 may need to access a relational database 208 to perform a SQL statement. The application runtime 204 then sends this statement to the wrapper functionality 210 inside the relational database 208. The wrapper functionality 110 performs a hash function on the SQL statement to generate a hash identification corresponding uniquely to the SQL statement. Once again the presence of the user 202 is optional.

The wrapper functionality 210 then looks up the hash identification in a lookup table 212. The lookup table may maintain mappings between hash identifications and object names (and optionally other object details, such as object type and timestamp). The object names are names of objects already stored in the relational database 108 of FIG. 1 that perform SQL statement functionality. If the hash identification is not found in the lookup table, then the wrapper functionality 210 creates a database object 214 in the relational database 208. The database object 214 is created such that when it is executed it performs the functionality of the SQL statement. This creation process includes precompiling the SQL statement and storing the compiled SQL statement in the database object 214, as well as creating an execution plan for the compiled SQL statement.

Whether by virtue of having just been created, or by virtue of its name being found in the lookup table in a mapping corresponding to the hash identification during a subsequent execution of the SQL statement, the database object 214 may then be executed to run the SQL statement. This may include executing the SQL statement differently depending upon the object type of the database object 214. Additionally, in certain instances an object that already exists may be regenerated or deleted if it exceeds one or more preset temporal thresholds (e.g., objects older than 4 months need to be regenerated, objects older than 1 year need to be deleted).

Figure 3:
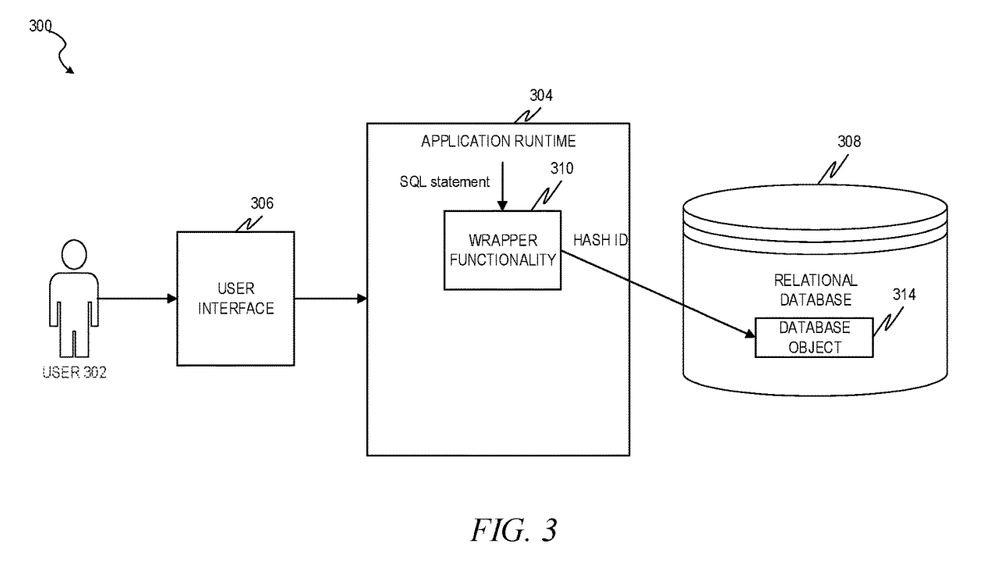
FIG. 3 is a block diagram illustrating a system for executing a SQL statement, in accordance with another example embodiment.

In some example embodiments, the hash function itself uses a naming convention that is consistent with the relational database, allowing the hash identification to be used as the object name. This effectively eliminates the need to have a lookup table. FIG. 3 is a block diagram illustrating a system 300 for executing a SQL statement, in accordance with another example embodiment. A user 302 may interact with an application runtime 304 via a user interface 306. As part of the interaction, the application runtime 304 may need to access a relational database 308 to perform a SQL statement. Rather than send this statement directly to the database, it is instead passed to a wrapper functionality 310.

The wrapper functionality 310 performs a hash function on the SQL statement to generate a hash identification corresponding uniquely to the SQL statement that is also consistent with a naming convention compatible with the relational database 308. Once again the presence of user 302 is optional.

The wrapper functionality 310 then uses the hash identification to attempt to call a database object having the hash identification in the relational database 308. If no object having that hash identification as a name is found in the relational database 308, then the wrapper functionality 310 creates a database object 314 in the relational database 308, and names it with the hash identification. The database object 314 is created such that when it is executed it performs the functionality of the SQL statement. This creation process includes precompiling the SQL statement and storing the compiled SQL statement in the database object 314, as well as creating an execution plan for the compiled SQL statement.

Whether by virtue of having just been created, or by virtue of its name being a match for the hash identification during a subsequent execution of the SQL statement, the database object 314 may then be executed to run the SQL statement. This may include executing the SQL statement differently depending upon the object type of the database object 314. Additionally, in certain instances an object that already exists may be regenerated or deleted, if it exceeds one or more preset temporal thresholds (e.g., objects older than 4 months need to be regenerated, objects older than 1 year need to be deleted). The wrapper functionality 310 may be part of a library that exists on the application runtime 304.

Figure 4:
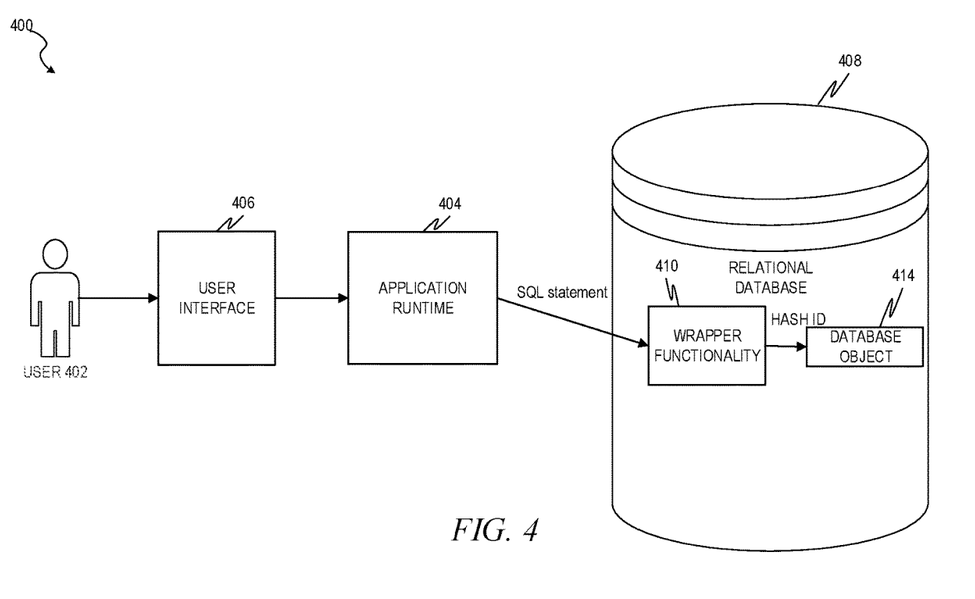
FIG. 4 is a block diagram illustrating a system for executing a SQL statement, in accordance with another example embodiment.

FIG. 4 is a block diagram illustrating a system 400 for executing a SQL statement, in accordance with another example embodiment. This embodiment is similar to that of FIG. 2, except the wrapper functionality 410 does not utilize a lookup table.

A user 402 may interact with an application runtime 404 via a user interface 406. As part of the interaction, the application runtime 404 may need to access a relational database 408 to perform an SQL statement. The application runtime 404 then sends this statement to the wrapper functionality 410 inside the relational database 408. The wrapper functionality 410 performs a hash function on the SQL statement to generate a hash identification corresponding uniquely to the SQL statement that is also consistent with a naming convention compatible with the relational database 308. Once again the presence of user 402 is optional.

The wrapper functionality 410 then uses the hash identification to attempt to call a database object having the hash identification in the relational database 408. If no object with that hash identification as a name is found in the relational database 408, then the wrapper functionality 410 creates a database object 414 in the relational database 408, and names it with the hash identification. The database object 414 is created such that when it is executed it performs the functionality of the SQL statement. This creation process includes precompiling the SQL statement and storing the compiled SQL statement in the database object 414, as well as creating an execution plan for the compiled SQL statement.

Whether by virtue of having just been created, or by virtue of its name being found in the lookup table in a mapping corresponding to the hash identification during a subsequent execution of the SQL statement, the database object 414 may then be executed to run the SQL statement. This may include executing the SQL statement differently depending upon the object type of the database object 414. Additionally, in certain instances an object that already exists may be regenerated or deleted if it exceeds one or more preset temporal thresholds (e.g., objects older than 4 months need to be regenerated, objects older than 1 year need to be deleted).

Figure 5:
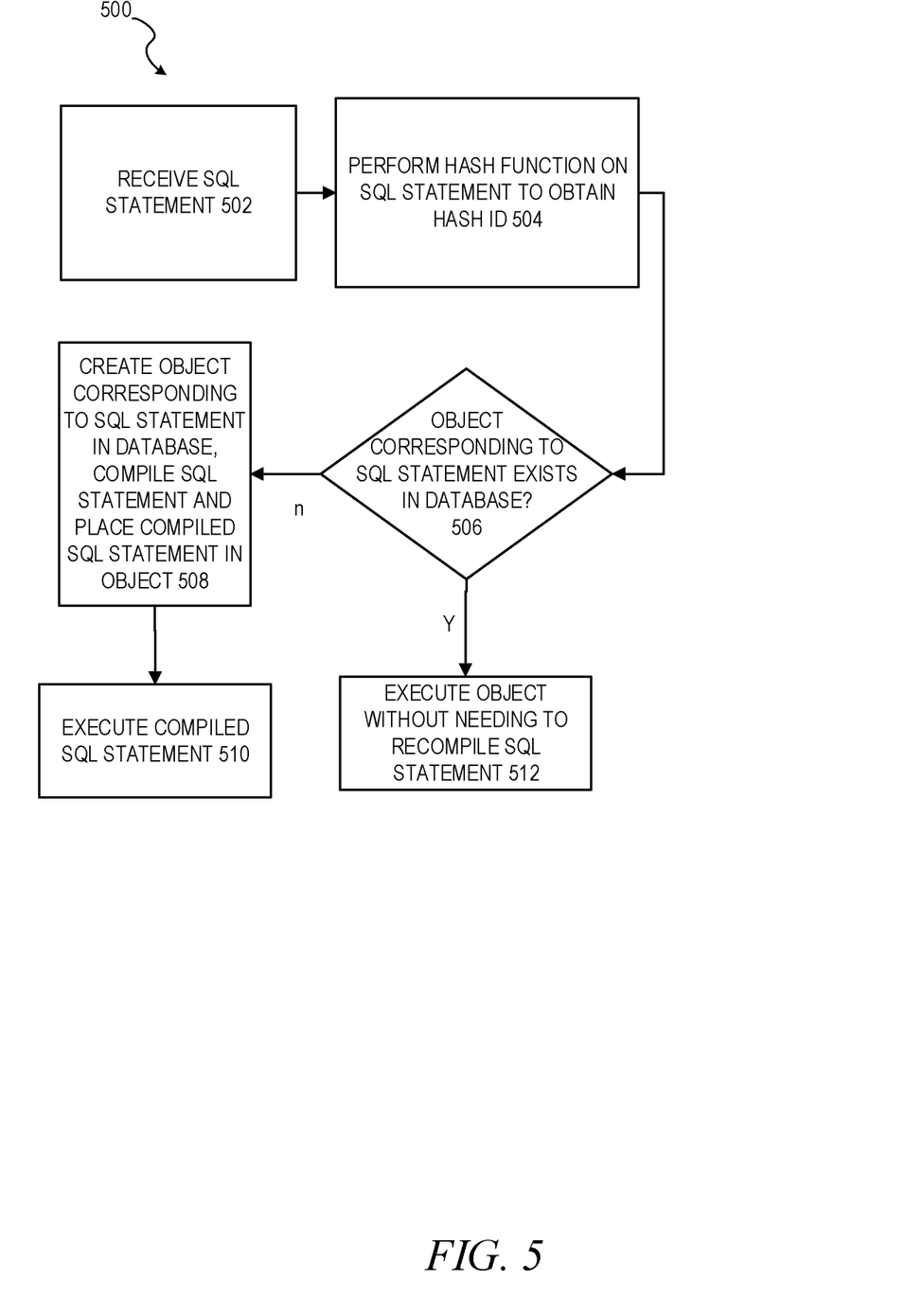
FIG. 5 is a flow diagram illustrating a method for executing a SQL statement.

FIG. 5 is a flow diagram illustrating a method 500 for executing a SQL statement, in accordance with an example embodiment. The method may be performed by a wrapper functionality located on either an application runtime or a relational database. In an example embodiment, the application runtime operates in a cloud environment where a connection between the application runtime and the relational database is terminated once the SQL statement has been executed.

At operation 502, a structured query language (SQL) statement is received from an application runtime. At operation 504, a hash function is performed on the SQL statement to obtain a hash identification. At operation 506, based on the hash identification, it is determined whether an object corresponding to the SQL statement exists in a relational database. In an example embodiment, the determination may include determining whether the hash identification exists in a lookup table containing mappings between hash identifications and object names, object types, and/or object creation timestamps.

If not, then at operation 508 the object corresponding to the SQL statement is created in the relational database by compiling the SQL, placing the compiled SQL statement in the object, and creating an execution plan for the SQL statement. The execution plan may or may not also be stored in the object. Then at operation 510 the compiled SQL statement is executed.

If at operation 506 it is determined that an object corresponding to the SQL statement does exist in a relational database, the object may be executed at operation 512 to perform the SQL statement without the SQL statement needing to be compiled (since it was previously compiled before the method 500 began).

In view of the above-described implementations of subject matter this application discloses the following list of examples, wherein one feature of an example in isolation or more than one feature of said example taken in combination and, optionally, in combination with one or more features of one or more further examples are further examples also falling within the disclosure of this application:

EXAMPLE 1

A system comprising:
at least one hardware processor; and
a non-transitory computer-readable medium storing instructions that, when executed by the at least one hardware processor, cause the at least one hardware processor to perform operations comprising:
    receiving, at a wrapper functionality, a structured query language (SQL) statement from an application runtime;
    performing a hash function on the SQL statement to obtain a hash identification;
    based on the hash identification, determining whether an object corresponding to the SQL statement exists in a relational database;
    in response to a determination that the object corresponding to the SQL statement does not exist in the relational database, creating the object corresponding to the SQL statement in the relational database by compiling the SQL, placing the compiled SQL statement in the object, and creating an execution plan for the SQL statement; and
    causing execution of the compiled SQL statement.

EXAMPLE 2

The system of Example 1, wherein the application runtime operates in a cloud environment where a connection between the application runtime and the relational database is terminated once the SQL statement has been executed.

EXAMPLE 3

The system of Examples 1 or 2, wherein the execution plan is further stored in the object.

EXAMPLE 4

The system of any of Examples 1-3, wherein the determining whether the object corresponding to the SQL statement exists in the relational database includes determining whether the hash identification exists in a lookup table.

EXAMPLE 5

The system of Example 4, wherein the lookup table contains mappings of hash identifications to corresponding object names.

EXAMPLE 6

The system of Example 5, wherein the lookup table further contains, for each mapping, an object type.

EXAMPLE 7

The system of Example 6, wherein the causing execution is performed in a manner that is dependent on the object type.

EXAMPLE 8

The system of any of Examples 5-7, wherein the lookup table further contains, for each mapping, a timestamp indicating when a corresponding object was created.

EXAMPLE 9

The system of Example 8, wherein the operations further comprise regenerating the object corresponding to the SQL statement if a timestamp in the mapping for the object is older than a first temporal threshold.

EXAMPLE 10

The system of Examples 8 or 9, wherein the operations further comprise deleting the object corresponding to the SQL statement if a timestamp in the mapping for the object is older than a second temporal threshold.

EXAMPLE 11

The system of any of Examples 1-10, wherein the operations further comprise:
in response to a determination that an object corresponding to a second SQL statement already exists in the relational database, causing execution of a compiled version of the second SQL statement without compiling the second SQL statement.

EXAMPLE 12

A method comprising:
receiving, at a wrapper functionality, a structured query language (SQL) statement from an application runtime;
performing a hash function on the SQL statement to obtain a hash identification;
based on the hash identification, determining whether an object corresponding to the SQL statement exists in a relational database;
in response to a determination that the object corresponding to the SQL statement does not exist in the relational database, creating the object corresponding to the SQL statement in the relational database by compiling the SQL, placing the compiled SQL statement in the object, and creating an execution plan for the SQL statement; and
causing execution of the compiled SQL statement.

EXAMPLE 13

The method of Example 12, wherein the application runtime operates in a cloud environment where a connection between the application runtime and the relational database is terminated once the SQL statement has been executed.

EXAMPLE 14

The method of Examples 12 or 13, wherein the execution plan is further stored in the object.

EXAMPLE 15

The method of any of Examples 12-14, wherein the determining whether the object corresponding to the SQL statement exists in the relational database includes determining whether the hash identification exists in a lookup table.

EXAMPLE 16

The method of Example 15, wherein the lookup table contains mappings of hash identifications to corresponding object names.

EXAMPLE 17

The method of Example 16, wherein the lookup table further contains, for each mapping, an object type.

EXAMPLE 18

The method of Example 17, wherein the causing execution is performed in a manner that is dependent on the object type.

EXAMPLE 19

The method of any of Examples 16-18, wherein the lookup table further contains, for each mapping, a timestamp indicating when a corresponding object was created.

EXAMPLE 20

A non-transitory machine-readable medium storing instructions which, when executed by one or more processors, cause the one or more processors to perform operations comprising:
receiving, at a wrapper functionality, a structured query language (SQL) statement from an application runtime;

performing a hash function on the SQL statement to obtain a hash identification;

based on the hash identification, determining whether an object corresponding to the SQL statement exists in a relational database;

in response to a determination that the object corresponding to the SQL statement does not exist in the relational database, creating the object corresponding to the SQL statement in the relational database by compiling the SQL, placing the compiled SQL statement in the object, and creating an execution plan for the SQL statement; and causing execution of the compiled SQL statement.

Figure 6:
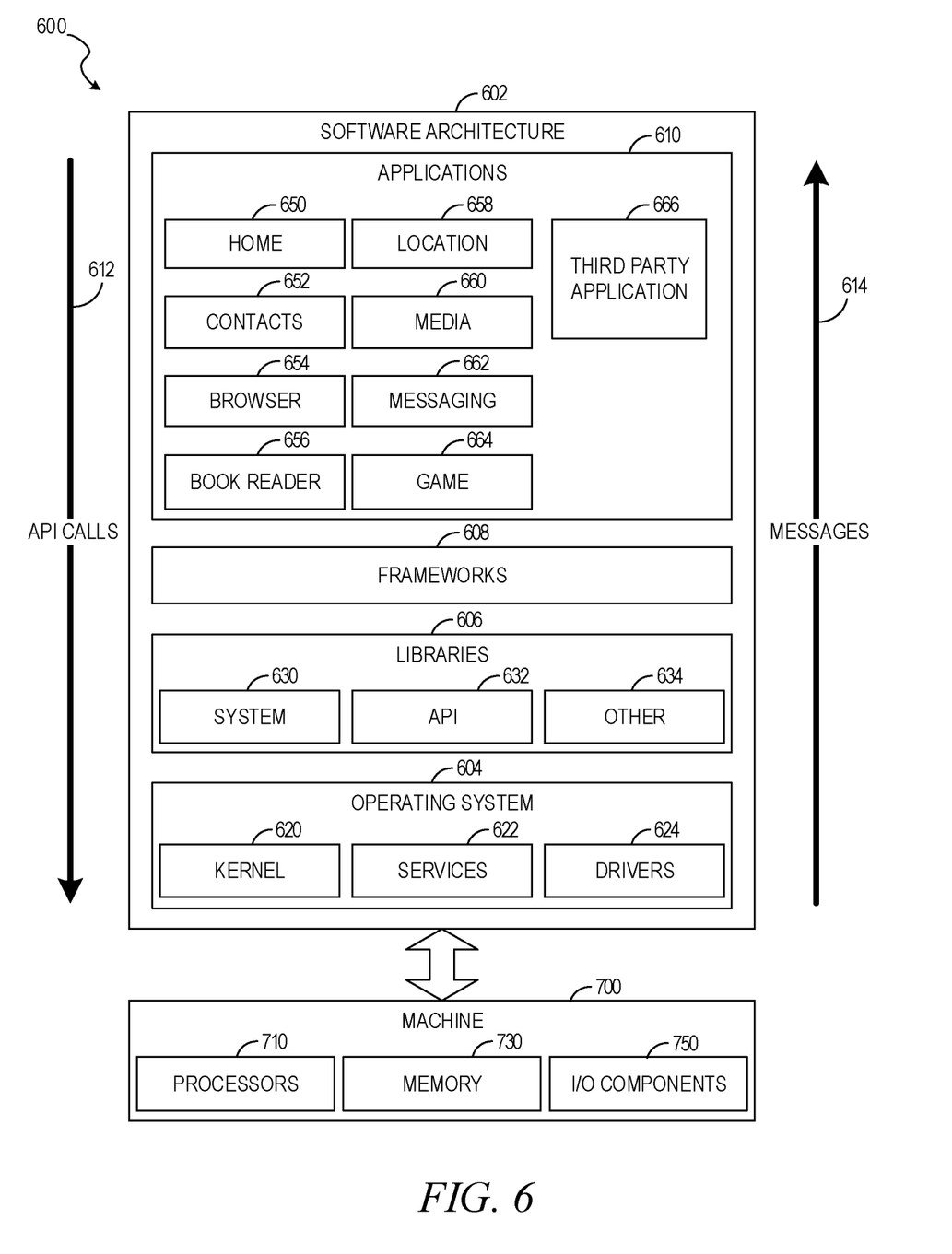
FIG. 6 is a block diagram illustrating an example architecture of software, which can be installed on any one or more of the devices described above.

FIG. 6 is a block diagram 600 illustrating a software architecture 602, which can be installed on any one or more of the devices described above. FIG. 6 is merely a non-limiting example of a software architecture, and it will be appreciated that many other architectures can be implemented to facilitate the functionality described herein. In various embodiments, the software architecture 602 is implemented by hardware such as a machine 700 of FIG. 7 that includes processors 710, memory 730, and input/output (I/O) components 750. In this example architecture, the software architecture 602 can be conceptualized as a stack of layers where each layer may provide a particular functionality. For example, the software architecture 602 includes layers such as an operating system 604, libraries 606, frameworks 608, and applications 610. Operationally, the applications 610 invoke Application Program Interface (API) calls 612 through the software stack and receive messages 614 in response to the API calls 612, consistent with some embodiments.

In various implementations, the operating system 604 manages hardware resources and provides common services. The operating system 604 includes, for example, a kernel 620, services 622, and drivers 624. The kernel 620 acts as an abstraction layer between the hardware and the other software layers, consistent with some embodiments. For example, the kernel 620 provides memory management, processor management (e.g., scheduling), component management, networking, and security settings, among other functionality. The services 622 can provide other common services for the other software layers. The drivers 624 are responsible for controlling or interfacing with the underlying hardware. For instance, the drivers 624 can include display drivers, camera drivers, BLUETOOTH® or BLUETOOTH® Low-Energy drivers, flash memory drivers, serial communication drivers (e.g., Universal Serial Bus (USB) drivers), Wi-Fi® drivers, audio drivers, power management drivers, and so forth.

In some embodiments, the libraries 606 provide a low-level common infrastructure utilized by the applications 610. The libraries 606 can include system libraries 630 (e.g., C standard library) that can provide functions such as memory allocation functions, string manipulation functions, mathematic functions, and the like. In addition, the libraries 606 can include API libraries 632 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two-dimensional (2D) and three-dimensional (3D) in a graphic context on a display), database libraries (e.g., SQLite to provide various relational database functions), web libraries (e.g., WebKit to provide web browsing functionality)), and the like. The libraries 606 can also include a wide variety of other libraries 634 to provide many other APIs to the applications 610.

The frameworks 608 provide a high-level common infrastructure that can be utilized by the applications 610. For example, the frameworks 608 provide various graphical user interface (GUI) functions, high-level resource management, high-level location services, and so forth. The frameworks 608 can provide a broad spectrum of other APIs that can be utilized by the applications 610, some of which may be specific to a particular operating system 604 or platform.

In an example embodiment, the applications 610 include a home application 650, a contacts application 652, a browser application 654, a book reader application 656, a location application 658, a media application 660, a messaging application 662, a game application 664, and a broad assortment of other applications, such as a third-party application 666. The applications 610 are programs that execute functions defined in the programs. Various programming languages can be employed to create one or more of the applications 610, structured in a variety of manners, such as object-oriented programming languages (e.g., Objective-C, Java, or C++) or procedural programming languages (e.g., C or assembly language). In a specific example, the third-party application 666 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 666 can invoke the API calls 612 provided by the operating system 604 to facilitate functionality described herein.

Figure 7:
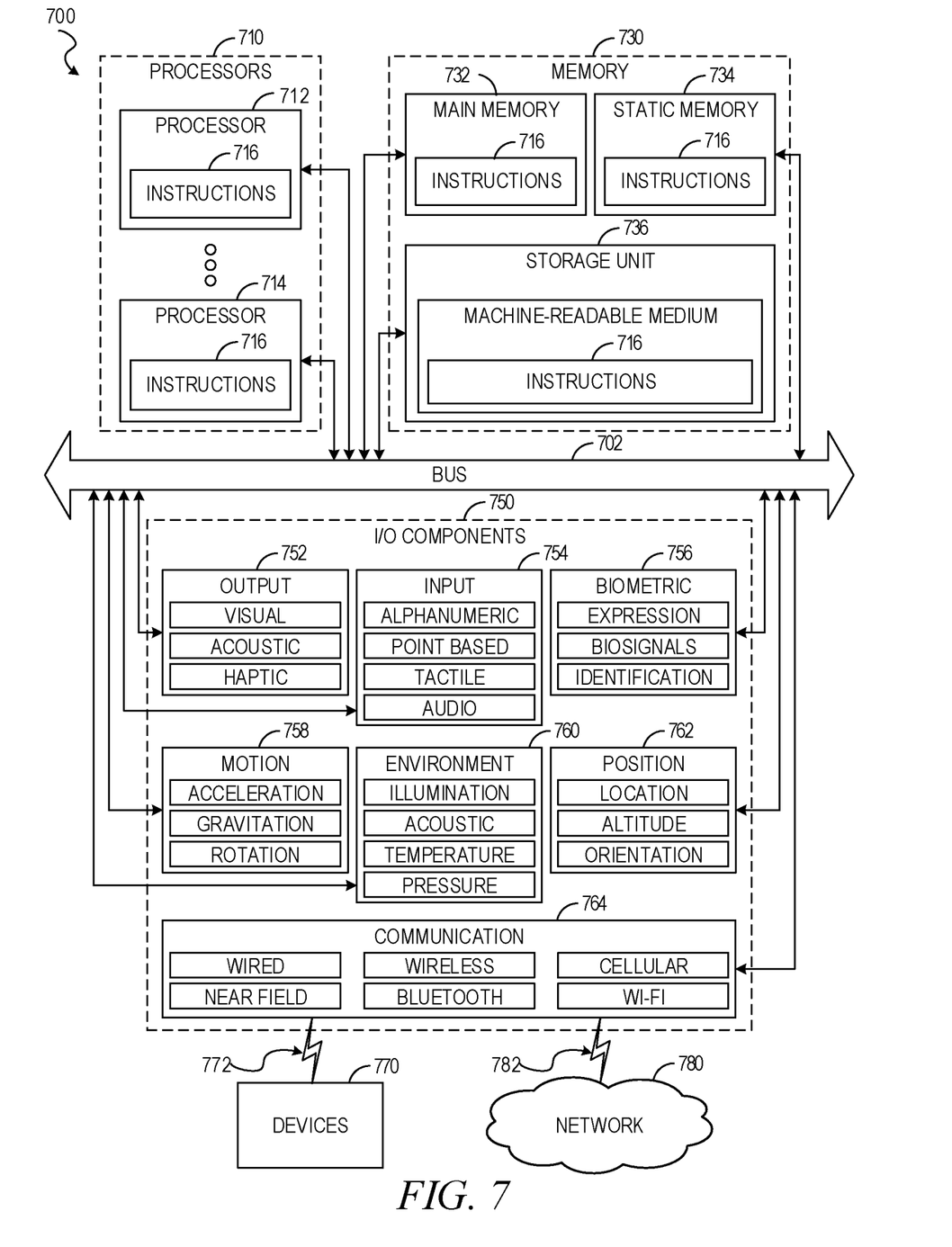
FIG. 7 illustrates a diagrammatic representation of a machine in the form of a computer system within which a set of instructions may be executed for causing the machine to perform any one or more of the methodologies discussed herein.

FIG. 7 illustrates a diagrammatic representation of a machine 700 in the form of a computer system within which a set of instructions may be executed for causing the machine 700 to perform any one or more of the methodologies discussed herein. Specifically, FIG. 7 shows a diagrammatic representation of the machine 700 in the example form of a computer system, within which instructions 716 (e.g., software, a program, an application, an applet, an app, or other executable code) for causing the machine 700 to perform any one or more of the methodologies discussed herein may be executed. For example, the instructions 716 may cause the machine 700 to execute the method of FIG. 5. Additionally, or alternatively, the instructions 716 may implement FIGS. 1-5 and so forth. The instructions 716 transform the general, non-programmed machine 700 into a particular machine 700 programmed to carry out the described and illustrated functions in the manner described. In alternative embodiments, the machine 700 operates as a standalone device or may be coupled (e.g., networked) to other machines. In a networked deployment, the machine 700 may operate in the capacity of a server machine or a client machine in a server-client network environment, or as a peer machine in a peer-to-peer (or distributed) network environment. The machine 700 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 716, sequentially or otherwise, that specify actions to be taken by the machine 700. Further, while only a single machine 700 is illustrated, the term "machine" shall also be taken to include a collection of machines 700 that individually or jointly execute the instructions 716 to perform any one or more of the methodologies discussed herein.

The machine 700 may include processors 710, memory 730, and I/O components 750, which may be configured to communicate with each other such as via a bus 702. In an example embodiment, the processors 710 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 712 and a processor 714 that may execute the instructions 716. The term "processor" is intended to include multi-core processors that may comprise two or more independent processors (sometimes referred to as "cores") that may execute instructions 716 contemporaneously. Although FIG. 7 shows multiple processors 710, the machine 700 may include a single processor 712 with a single core, a single processor 712 with multiple cores (e.g., a multi-core processor 712), multiple processors 712, 714 with a single core, multiple processors 712, 714 with multiple cores, or any combination thereof.

The memory 730 may include a main memory 732, a static memory 734, and a storage unit 736, each accessible to the processors 710 such as via the bus 702. The main memory 732, the static memory 734, and the storage unit 736 store the instructions 716 embodying any one or more of the methodologies or functions described herein. The instructions 716 may also reside, completely or partially, within the main memory 732, within the static memory 734, within the storage unit 736, within at least one of the processors 710 (e.g., within the processor's cache memory), or any suitable combination thereof, during execution thereof by the machine 700.

The I/O components 750 may include a wide variety of components to receive input, provide output, produce output, transmit information, exchange information, capture measurements, and so on. The specific I/O components 750 that are included in a particular machine will depend on the type of machine. For example, portable machines such as mobile phones will likely include a touch input device or other such input mechanisms, while a headless server machine will likely not include such a touch input device. It will be appreciated that the I/O components 750 may include many other components that are not shown in FIG. 7. The I/O components 750 are grouped according to functionality merely for simplifying the following discussion, and the grouping is in no way limiting. In various example embodiments, the I/O components 750 may include output components 752 and input components 754. The output components 752 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 754 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 750 may include biometric components 756, motion components 758, environmental components 760, or position components 762, among a wide array of other components. For example, the biometric components 756 may include components to detect expressions (e.g., hand expressions, facial expressions, vocal expressions, body gestures, or eye tracking), measure bio signals (e.g., blood pressure, heart rate, body temperature, perspiration, or brain waves), identify a person (e.g., voice identification, retinal identification, facial identification, fingerprint identification, or electroencephalogram-based identification), and the like. The motion components 758 may include acceleration sensor components (e.g., accelerometer), gravitation sensor components, rotation sensor components (e.g., gyroscope), and so forth. The environmental components 760 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 762 may include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 750 may include communication components 764 operable to couple the machine 700 to a network 780 or devices 770 via a coupling 782 and a coupling 772, respectively. For example, the communication components 764 may include a network interface component or another suitable device to interface with the network 780. In further examples, the communication components 764 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 770 may be another machine or any of a wide variety of peripheral devices (e.g., coupled via a USB).

Moreover, the communication components 764 may detect identifiers or include components operable to detect identifiers. For example, the communication components 764 may include radio-frequency identification (RFID) tag reader components, NFC smart tag detection components, optical reader components (e.g., an optical sensor to detect one-dimensional bar codes such as Universal Product Code (UPC) bar code, multi-dimensional bar codes such as QR code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 764, such as location via Internet Protocol (IP) geolocation, location via Wi-Fi® signal triangulation, location via detecting an NFC beacon signal that may indicate a particular location, and so forth.

The various memories (i.e., 730, 732, 734, and/or memory of the processor(s) 710) and/or the storage unit 736 may store one or more sets of instructions 716 and data structures (e.g., software) embodying or utilized by any one or more of the methodologies or functions described herein. These instructions (e.g., the instructions 716), when executed by the processor(s) 710, cause various operations to implement the disclosed embodiments.

As used herein, the terms "machine-storage medium," "device-storage medium," and "computer-storage medium" mean the same thing and may be used interchangeably. The terms refer to single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate array (FPGA), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

In various example embodiments, one or more portions of the network 780 may be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 780 or a portion of the network 780 may include a wireless or cellular network, and the coupling 782 may be a Code Division Multiple Access (CDMA) connection, a Global System for Mobile communications (GSM) connection, or another type of cellular or wireless coupling. In this example, the coupling 782 may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long-Term Evolution (LTE) standard, others defined by various standard-setting organizations, other long-range protocols, or other data transfer technology.

The instructions 716 may be transmitted or received over the network 780 using a transmission medium via a network interface device (e.g., a network interface component included in the communication components 764) and utilizing any one of a number of well-known transfer protocols (e.g., Hypertext Transfer Protocol (HTTP)). Similarly, the instructions 716 may be transmitted or received using a transmission medium via the coupling 772 (e.g., a peer-to-peer coupling) to the devices 770. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 716 for execution by the machine 700, and include digital or analog communications signals or other intangible media to facilitate communication of such software. Hence, the terms "transmission medium" and "signal medium" shall include any form of modulated data signal, carrier wave, and so forth. The term "modulated data signal" means a signal that has one or more of its characteristics set or changed in such a manner as to encode information in the signal.

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

What is claimed is:

1. A system comprising:
   at least one hardware processor; and
   a non-transitory computer-readable medium storing instructions that, when executed by the at least one hardware processor, cause the at least one hardware processor to perform operations comprising:
   receiving, at a wrapper functionality implemented inside a relational database as a stored procedure in a database layer, a structured query language (SQL) statement from an application runtime;
   performing, by the wrapper functionality, a hash function on the SQL statement to obtain a hash identification;
   based on the hash identification, determining, by the wrapper functionality, whether a database object corresponding to the SQL statement exists in a relational database, the database object being a view;
   in response to a determination that the database object corresponding to the SQL statement does not exist in the relational database, creating, by the wrapper functionality, in the relational database, the database object corresponding to the SQL statement by compiling the SQL statement into an executable file, placing the executable file in the database object in the relational database, and creating an execution plan for the SQL statement; and
   causing execution of the executable file,
   the application runtime operating in a cloud environment where all connections between the application runtime and the relational database are required to be terminated once the executable file has been executed, leaving no open connections between the application runtime and the relational database and thereby reducing how many connections being handled by the cloud environment.

2. The system of claim 1, wherein the execution plan is further stored in the database object.

3. The system of claim 1, wherein the determining whether the database object corresponding to the SQL statement exists in the relational database includes determining whether the hash identification exists in a lookup table.

4. The system of claim 3, wherein the lookup table contains mappings of hash identifications to corresponding object names.

5. The system of claim 4, wherein the lookup table further contains, for each mapping, an object type.

6. The system of claim 5, wherein the causing execution is performed in a manner that is dependent on the object type.

7. The system of claim 4, wherein the lookup table further contains, for each mapping, a timestamp indicating when a corresponding database object was created.

8. The system of claim 7, wherein the operations further comprise regenerating the database object corresponding to the SQL statement if a timestamp in the mapping for the database object is older than a first temporal threshold.

9. The system of claim 7, wherein the operations further comprise deleting the database object corresponding to the SQL statement if a timestamp in the mapping for the database object is older than a second temporal threshold.

10. The system of claim 1, wherein the operations further comprise:
in response to a determination that the database object corresponding to a second SQL statement already exists in the relational database, causing execution of a compiled version of the second SQL statement without compiling the second SQL statement.

11. The system of claim 1, wherein the operations further comprise:
receiving a second SQL statement;
performing the hash function on the second SQL statement to obtain a second hash identification;
based on the second hash identification, determining whether an object corresponding to the second SQL statement exists in a relational database; and
in response to a determination that the object corresponding to the second SQL statement does exist in the relational database, retrieving the object corresponding to the second SQL statement and executing a second compiled SQL statement stored in the object corresponding to the second SQL statement.

12. A method comprising:
receiving, at a wrapper functionality implemented inside a relational database as a stored procedure in a database layer, a structured query language (SQL) statement from an application runtime;
performing, by the wrapper functionality, a hash function on the SQL statement to obtain a hash identification;
based on the hash identification, determining, by the wrapper functionality, whether a database object corresponding to the SQL statement exists in a relational database;
in response to a determination that the database object corresponding to the SQL statement does not exist in the relational database, creating, by the wrapper functionality, in the relational database, the database object corresponding to the SQL statement by compiling the SQL statement into an executable file, placing the executable file in the database object in the relational database, and creating an execution plan for the SQL statement; and
causing execution of the executable file,
the application runtime operating in a cloud environment where all connections between the application runtime and the relational database are required to be terminated once the executable file has been executed, leaving no open connections between the application runtime and the relational database and thereby reducing how many connections being handled by the cloud environment.

13. The method of claim 12, wherein the execution plan is further stored in the database object.

14. The method of claim 12, wherein the determining whether the database object corresponding to the SQL statement exists in the relational database includes determining whether the hash identification exists in a lookup table.

15. The method of claim 14, wherein the lookup table contains mappings of hash identifications to corresponding object names.

16. The method of claim 15, wherein the lookup table further contains, for each mapping, an object type.

17. The method of claim 16, wherein the causing execution is performed in a manner that is dependent on the object type.

18. The method of claim 15, wherein the lookup table further contains, for each mapping, a timestamp indicating when a corresponding object was created.

19. The method of claim 12, further comprising:
receiving a second SQL statement;
performing the hash function on the second SQL statement to obtain a second hash identification;
based on the second hash identification, determining whether an object corresponding to the second SQL statement exists in a relational database; and
in response to a determination that the object corresponding to the second SQL statement does exist in the relational database, retrieving the object corresponding to the second SQL statement and executing a second compiled SQL statement stored in the object corresponding to the second SQL statement.

20. A non-transitory machine-readable medium storing instructions which, when executed by one or more processors, cause the one or more processors to perform operations comprising:
receiving, at a wrapper functionality implemented inside a relational database as a stored procedure in a database layer, a structured query language (SQL) statement from an application runtime;
performing, by the wrapper functionality, a hash function on the SQL statement to obtain a hash identification;
based on the hash identification, determining, by the wrapper functionality, whether a database object corresponding to the SQL statement exists in a relational database, the database object being a view;
in response to a determination that the database object corresponding to the SQL statement does not exist in the relational database, creating, by the wrapper functionality, in the relational database, the database object corresponding to the SQL statement by compiling the SQL statement into an executable file, placing the executable file in the database object in the relational database, and creating an execution plan for the SQL statement; and
causing execution of the executable file,
the application runtime operating in a cloud environment where all connections between the application runtime and the relational database are required to be terminated once the executable file has been executed, leaving no open connections between the application runtime and the relational database and thereby reducing how many connections being handled by the cloud environment.

\* \* \* \* \*